Dec. 17, 1963
D. M. FINCH
3,114,892
RUNWAY GUIDANCE SYSTEM
Filed Feb. 19, 1959
2 Sheets-Sheet 1
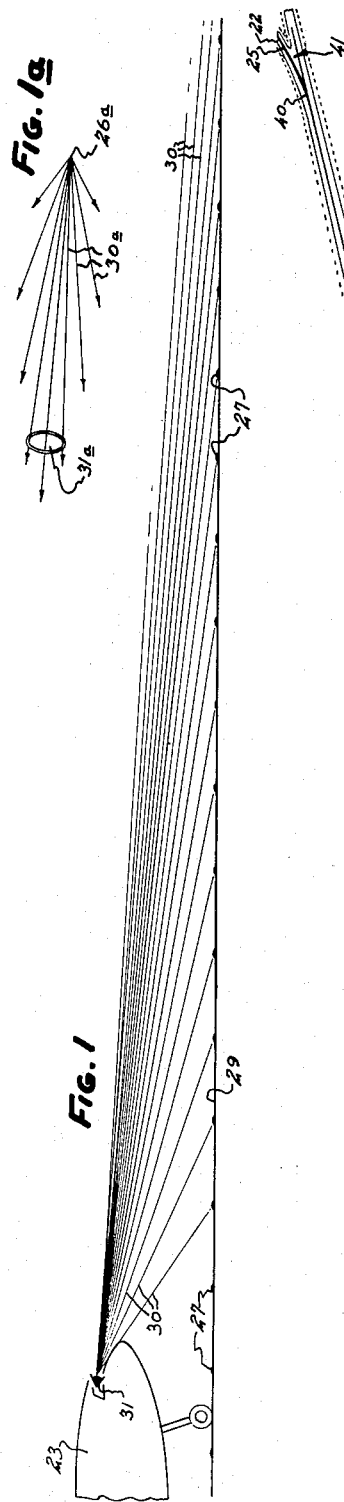
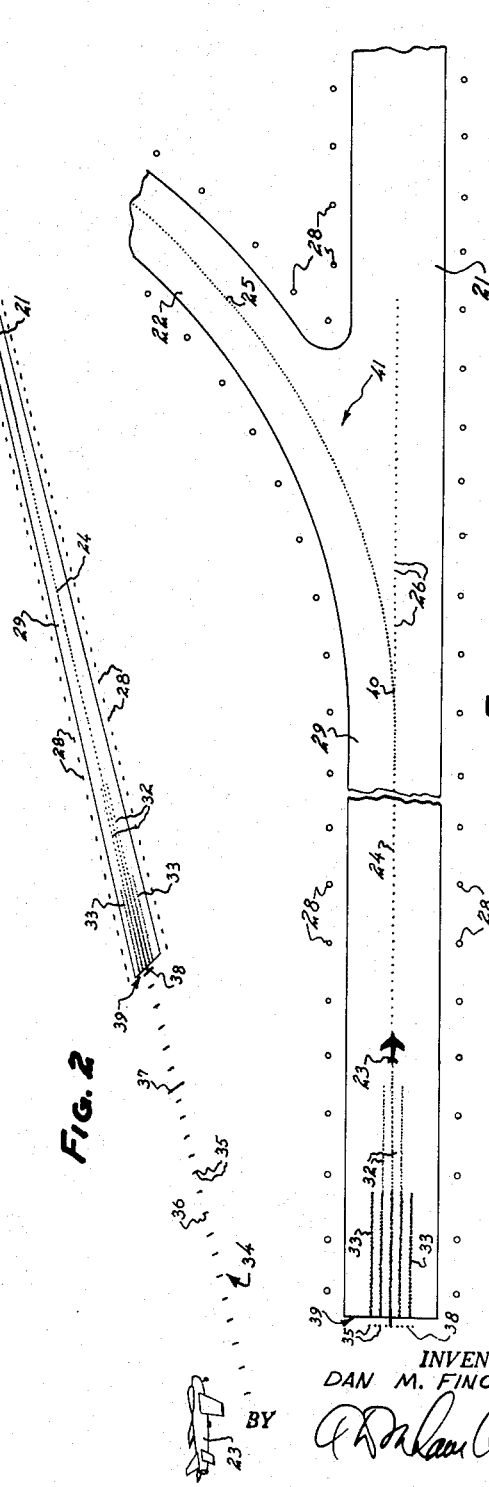
INVENTOR.
DAN M. FINCH
BY
ATTORNEY Dec. 17, 1963    D. M. FINCH    3,114,892
RUNWAY GUIDANCE SYSTEM
Filed Feb. 19, 1959    2 Sheets-Sheet 2
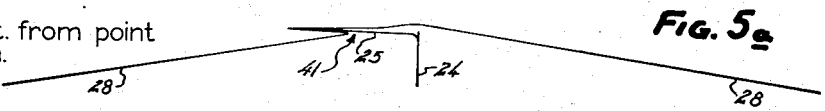
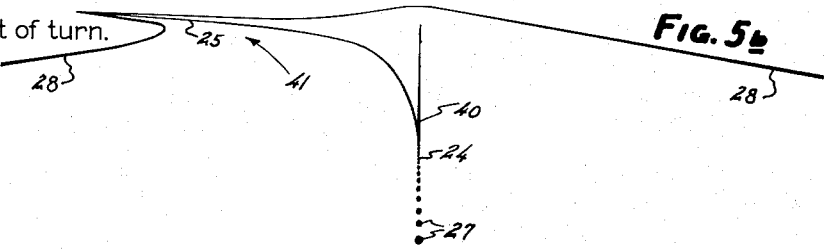
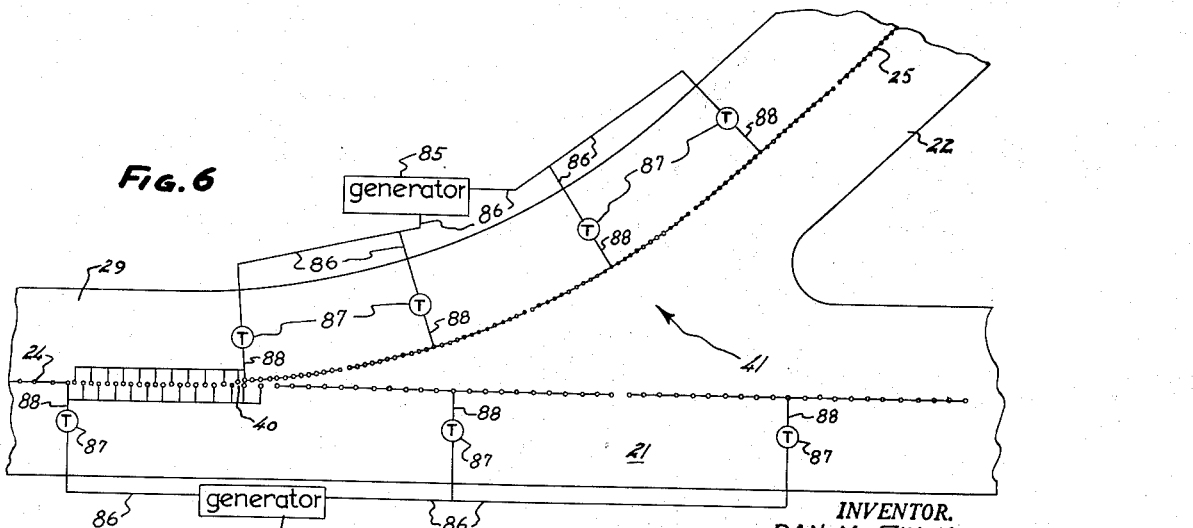
INVENTOR.
DAN M. FINCH
BY
ATTORNEY

United States Patent Office 3,114,892
Patented Dec. 17, 1963

3,114,892
RUNWAY GUIDANCE SYSTEM
Dan M. Finch, Berkeley, Calif., assignor to The Regents of the University of California, Berkeley, Calif.
Filed Feb. 19, 1959, Ser. No. 794,358
10 Claims. (Cl. 340—26)

This invention relates to improvements in guidance systems for vehicles traveling on or near the ground. More particularly, it relates to airfield contour guiding systems employing a plurality of light sources which produce patterns or contours delineating pathways and boundaries at night and during unfavorable weather conditions, to guide aircraft on or near the ground. A separate application entitled "Light Fixture for Lineal Guidance System" which is a divisional application of this present parent application, was filed on December 29, 1959 and has Serial No. 46,853.

The control and accommodation of air traffic around and on airports is a vastly complex problem which has grown more serious due to the rapid rise in aircraft transport traffic in recent years and to the increase in speed of modern jet aircraft. A major aspect of this serious problem is the guidance of aircraft at the terminus of their approach to the runway, just before contacting the runway and during the landing roll following touchdown. Since, in a given airport facility, all the aircraft intending to land under instrument conditions must, generally, use the same runway, it is essential that every aircraft, after landing, clear the runway as quickly as possible to make room for the next aircraft preparing to land.

Improvements in approach guidance control techniques, such as the well known ILS and GCA systems, now permit aircraft to approach the runway at a more rapid rate and at more closely spaced intervals, even at night and under adverse weather conditions. Thus the runway facilities are now taxed to even greater limits, and runways have become bottlenecks which have limited the aircraft acceptance rate at even the largest facilities, causing congestion and delay, with their attendant hazards.

Congestion has been relieved during daytime hours by using high-speed taxiways or turnouts by which the landing aircraft turns away gradually from the runway while still rolling at a relatively high speed, instead of taxiways at right angles to the runways, which require aircraft to decelerate to very low speeds before they are able to turn off. During daylight, the runways and high-speed taxiways may be adequately marked with paint, so that an aircraft can continue its landing roll following touchdown, at a higher speed and with the turnout well marked can enter the turnout and clear the runway at a rapid rate, leaving it clear for the next aircraft to land.

However, at night there has been no way to keep the turnoff passageway well marked and visible at such a distance that the pilot will be guided with a minimum of confusion along the prescribed pathway, allowing sufficient reaction time to smoothly and safely maneuver the aircraft. The present invention solves this problem by providing a novel system of light paths on the runway surface that delineate the route which the pilot is to follow and guide him clearly and rapidly along his route so that he can clear the runway as quickly as in the daytime.

Another serious need for improved runway guidance lighting arose with respect to the landing phase just prior to touchdown. After completing his approach, a pilot must flare out his guide path and fly almost parallel to the runway until he lands. In this final landing phase of the transition from air to ground, the pilot is forced to rely upon visual aids entirely for his guidance. Present airport runway lighting systems universally consist of edgelights which are spaced on approximately 200-foot centers along both sides of the entire runway. The edgelighting system causes a "black hole" effect. As a pilot approaches the runway, the two rows appear to move upward and further apart. When flying between the rows and close to the ground, the edgelights can no longer be seen. Alignment, roll, height and distance guidance become ineffective and the pilot is virtually "flying blind." This condition becomes increasingly dangerous as jet aircraft come into use, for they not only land at a higher speed but are less stable just before touchdown.

The present invention also solves this problem by giving centerline illumination which the pilot can see at all times and which guides him in making his landing and after the plane is on the ground.

The over-all problem thus presented by the aforementioned factors is that of producing an artificial airport guidance system which will provide a visual pattern at night and during adverse weather conditions, giving visual information to the pilot that is substantially equivalent to daylight conditions and is capable of guiding the pilot as he completes his approach onto the runway and then along the runway and off it via an exit taxiway. Solution of this problem will allow aircraft to land under lower minimum weather conditions than presently permitted, viz, 200-ft. ceiling, ½-mile visual range, and also to clear the runway at maximum speed.

The present invention solves this runway night-guidance problem by presenting an entirely new concept of guidance lighting. The new system entails the use of a plurality of small point sources of light arranged in fixed space relation to define runway and taxiway centerlines and edge boundaries.

Although small point sources of light are used, they are so arranged that they delineate solid lines or contours, when viewed at a distance. The lights, when properly spaced on the runway surface, enable the pilot to see directional guidance contours as solid lines for great distances and under limited visibility conditions, when the aircraft is close to or on the ground.

Another object of my invention is to provide an airport lighting system which may be easily installed on a runway centerline to present a night guidance pattern which appears as a continuous straight line when viewed by a pilot of an approaching aircraft.

Another object of my invention is to provide an airport marking system comprising a plurality of small single-point light sources requiring a relatively small amount of electrical energy and arranged in closely spaced relation on the runway surface, the light sources being readily visible from an approaching aircraft and appearing in solid line contours to define a runway centerline and a high-speed turnout taxiway to guide the aircraft.

Still another object of my invention is to provide an airport marking system comprising a plurality of small light sources arranged in closely spaced relation to define substantially parallel lines located on and extending from the threshold of the runway for at least a portion of its total length, and including a runway centerline. The parallel lines serve to create a runway texture which aids the pilot in making a smooth, well-guided transition from the approach lighting system to the actual touchdown on the runway.

It is apparent that in order to provide light sources which can be located to delineate a runway centerline over which aircraft are traveling, the problem must be solved of producing efficient light intensity while maintaining adequate protection for the light source. Further problems of installation and maintenance required solution before the centerline lighting system could become technically and economically feasible. These particular problems are solved by the novel light fixture described in my aforementioned divisional application Serial No. 46,853.

Other objects and advantages of the invention will be understood from the following description of a preferred embodiment thereof.

In the drawings:

FIG. 1 is a view in side elevation of a runway having single-point light sources and showing the sight lines along which the light sources are viewed by the pilot of an approaching aircraft.

FIG. 1a is a schematic view of a typical light source with rays emanating therefrom, illustrating the effect of light flux on a solid angle.

FIG. 2 is a view in perspective of a portion of the system, showing illumination of the runway centerline and of the turnout taxiway, and threshold lighting on the runway shown in conjunction with a standard-approach lighting system.

FIG. 3 is a top plan view of an airport runway using a lighting system which embodies the present invention.

FIG. 4 is a pair of perspective views of a runway lighting system without the centerline lighting, as it is seen by a pilot at the end of the runway, FIG. 4a showing the pattern as it appears to him 2,000 feet from the point of turn and FIG. 4b the same pattern as seen at the point of turn.

FIG. 5 is a similar pair of perspective views of a runway with centerline lighting as it would be viewed by a pilot near the end of a runway, with FIGS. 5a and 5b corresponding to FIGS. 4a and 4b.

FIG. 6 is a fragmentary plan view of a runway-lighting system showing a typical circuit connection.

Night Guidance Systems

Broadly speaking, my invention is directed to a new and unique airport guidance system which makes it possible for pilots of aircraft to delineate ground guidance contours on the runway at night both before and after touchdown of the aircraft during the landing phase. An important feature of my invention is that it can easily be installed on the surface of airport runways and taxiways. In general, my novel guidance system comprises a ground marking system for an airport having a runway 21 and a high-speed turnout taxiway 22, which gradually curves away from the runway 21, enabling an aircraft 23 to clear the runway 21 at a high speed. Night-guiding centerlines 24 and 25 are installed upon the runway 21 and taxiway 22 and consist of small, single-point light sources 26 housed in fixtures 27 which are arranged in closely spaced relation so that they appear to merge and permit the light to be seen by approaching pilots in the form of a solid contour pathway, over which the aircraft 23 will travel.

The centerline light-paths 24 and 25 provided by this invention for runway guidance and, in fact, for any type of vehicular pathway guidance, are highly effective as a visual aid and are much more desirable than the inadequate edgelighting systems heretofore in use on airports, though runway edgelights 28 may be used to advantage in conjunction with centerline lighting systems.

One reason for the greater effectiveness of centerline marking systems is explainable by reference to one of the limitations of human vision. The eye has sharp, clear vision from only a small central area known as the fovea, which represents less than 5% of the total field of vision. The remaining portion is sensitive only to brightness changes and motion, and the contrast sensitivity and acuity decreases rapidly to almost nothing at the extreme edge of vision. In the process of seeing, the eyes focus on one point at a time, to scan from point to point and take in an entire picture. Thus, a pilot scans with his eyes while over the approach zone and as the runway threshold nears his attention is concentrated straight ahead. The eyes are held almost motionless and when there is lack of visual guidance in the foveal region, the eyes tend to focus on infinity. Thus, the pilot's reaction will be most sensitive to the visual pattern presented directly within the foveal vision angle, such as lineal contour centerlines.

The present invention uses point sources of light so distributed along lines to present to the pilot's eyes a visual contour or solid line instead of just appearing as a pattern of separate lights. For purposes of visual guidance over distant pathways at night it is more effective for the pilot to view pathways as lineal contours rather than as separate marker lights, due to the usual acuity phenomenon. The human eye has considerably better acuity for lines proceeding in a continuous direction ahead than it has for separate objects. Separate objects of high contrast, separated by only one foot, can be resolved at about 3,000 feet whereas continuous lines similarly separated can be resolved at 9,000 feet. This phenomenon is known as contour acuity and is exploited in the present invention to provide a night-time visual scene and give adequate guidance to the pilot on the runway.

While it might, at first blush, appear to be logical therefore to install a long, continuous globe or bulb down the runway centerline, this is, of course, technically and economically impractical. Long, continuous bulbs would require large voltage outputs and would provide a difficult hazard on the runway surface. Another disadvantage of a long tube type of light bulb is that such bulbs have relatively low brightness when viewed lengthwise. The output or brightness of tube lights is dependent on the operating temperature of the bulb, which presents serious design problems due to variable outside climatic conditions. Installation problems also make the tube-type bulb undesirable. Tube bulbs are of the gaseous discharge type requiring a ballast or current-limiting device to control the current. An inherent characteristic of the gaseous discharge tube is that when a fixed voltage is applied the resistance progressively decreases, thus increasing current. A current-limiting device is thus required which seriously complicates the electrical circuit and limits the use of long, tube-like light sources. The present invention achieves highly effective lineal contours by a unique application of point-source fixtures, and with additional advantages that become apparent from the following description.

To illustrate how my invention utilizes in part the limited resolving power phenomenon of human vision, consider FIG. 1 which schematically shows a runway surface 29, having lights 26 housed in fixtures 27 spaced at predetermined intervals, along the path of an approaching aircraft 23. Light rays 30 are drawn from the point sources of light to the pilot's eye 31, which may be from 6 to 25 feet above the runway surface 29, in an aircraft 23 traveling down the runway. When the light rays 30 come closely enough together to fall below the resolving power of the pilot's eye 31, the light 26 will appear as a single line to the pilot, instead of as separate dots. Thus, to a pilot viewing the centerlines 24 and 25 of lights 26, equally spaced straight ahead, the lights 26 will appear as dots directly ahead of the aircraft 23 at relatively close distances and then tend to merge into a solid line at greater distances.

The brightness of the solid line will be equal to the cumulative brightness of the merged single light sources. This effect, shown diagrammatically in FIG. 1a is due to the fact that intensity I (or brightness) is equal to the light flux shown as light rays 30a divided by a solid angle 31a of viewing area at the point the flux is measured, such as the pilot's eye 31. It is to be noted that the brightness is not affected by distance as is illumination measured in foot-candles which decreases with the square of the distance from the light source. This phenomenon is highly important in my invention, because when the small light sources 26 merge as one solid line the brightness of the line effectively increases by the amount each light source contributes. Since the small light source creates a very small amount of background illumination around it, the end result at night is a very bright solid line of high contrast which affords the excellent lineal contour guidance characteristics.

The intensity of the light effect will change by varying the space between the lights 26 and the size of each light source. Spacing the lights 26 more closely will concentrate the light intensity I by increasing the amount of flux per solid angle and give the line contour effect at a closer distance. It has been found that lights separated by as as much as 50 feet still will yield a continuous-line effect at 2,000 feet and beyond. As a standard for correlation between light spacing and normal visual acuity which produces the lineal contour effect, the horizontal spacing of light units on the runway centerline should be 20 feet, if the centerline runway is used as a reference and if there is an intermediate sighting distance of 1,000 feet, a pilot's eye height of 15 feet, and a minimum angle of resolution of one minute of arc. At a greater distance the centerline lights 26 will merge together, while at a closer distance they will be seen as distinct sources.

Shown in FIG. 3 is a plan view of an airport lighting system embodying the principles of my invention. Runway 21 is provided with light sources 26 on its centerline 24, spaced about 20 feet apart. A taxiway 22 is shown as having similar light sources 26 on its centerline 25, spaced about 10 feet apart. Runway and taxiway edges are adequately defined by lights 28 having greater spacing of from about 50 to 100 feet between lights, since reduced intensity in these areas is required. The closer spacing of about 10 feet between lights 26 on the taxiway centerline 25 is required to compensate for the apparent separation of the lights 26 as the angle of view increases with respect to the tangent of the curve of taxiway centerline 25. The high-speed taxiway 22 is designed according to known principles to have the proper amount of curvature to permit the maximum rate of turn for the aircraft 23 with respect to its gross weight, minimum permissible turning radii, and rate of speed, while giving consideration to maximum safety and comfort of the passengers. Thus, an aircraft 23 following this taxiway 22 at normal landing-roll speed will clear the runway 21 at maximum speed.

To provide the pilot with an adequate visual guidance pattern just prior to landing and as a means to aid the transition from approach-light guidance to final touchdown, additional rows 32 and 33 of closely spaced lights 26 may be placed on the runway threshold 39 to give the runway 21 a texture presentation at night and during poor visibility conditions.

Referring to FIG. 2, showing an aircraft on an instrument approach under minimum weather conditions or during night operations, the pilot is guided down the approach to the runway by a high-intensity approach lighting system 34 such as the standard "Configuration A" system currently employed at the major airports. This approach system 34 extends about 3,000 feet from the end of the runway 21 and consists of light sources 35 arranged in crossbars 36 spaced about 150-200 ft. apart, having five lights each, of approximately 50,000 candlepower, the crossbars 36 being perpendicular to and centered across a line extending from the runway centerline 24. At approximately 1000 feet from the end of the runway is a longer crossbar 37 which constitutes the inner marker or "decision point" and at about 200 feet from the end of the runway 21 is another larger bar 38 of red lights which terminates the approach lighting system 34. The approach lighting system 34 provides, in essence, a trough of extremely high-intensity light and, as the pilot passes over the red bar 38 at the end of his approach, during a night landing, and commences to flare out for the touchdown, he would normally leave the glare of the approach trough and suddenly be confronted with the inky black runway threshold referred to by pilots as the "black hole."

At the threshold 39 of the runway 21, as shown in FIGS. 2 and 3, I therefore provide four rows 32 and 33 of lights mounted in accordance with the present invention, said rows extending for limited distances down the runway surface substantially parallel to the centerline 24. The purpose of these rows of lights 26 is to provide solid lines on the runway surface 29 in the same manner as the runway centerline 24, using the lineal contour principle, which will guide the pilot during the transition phase from approach to touchdown. The rows of lights 32 and 33 are spaced at approximately 20 feet apart, with the rows 32 closest to the centerline extending for approximately 3,000 feet down the runway surface 29 and the rows 33 farthest from the centerline, i.e., approximately 40 feet on either side, extending for approximately 1000 feet. The addition of the rows of lights 32 and 33 on the runway threshold will provide a visual pattern defining runway texture or the plane of its surface by building up the effective intensity on the runway surface. In addition, the lines produced by the threshold lighting will give the pilot important information on lateral displacement of the aircraft with the runway and any discrepancies in aircraft attitude such as roll and yaw just prior to touchdown. The use of rows of lights of different lengths also affords information to the pilot of his distance down the runway, providing additional decision time for the turnoffs and "go-arounds."

As a part of the threshold lighting portion of my invention, I prefer to extend the lights 26 on the runway centerline 24 up to the final red crossbar 38 of the approach lighting system 34. Also, in order to provide the necessary brightness and contrast on the runway threshold 39, I have found it more effective to use light sources 26 of maximum power, i.e., 15 watts, and to reduce spacing of the light sources 26 to around 2 to 5 feet. The spacing of light sources 26 on the parallel lines 32 and 33 is also reduced near the end of the runway 21 to from 2 to 5 feet. The closer spacing is carried along lines 32 and 33 and the runway centerline 24 to approximately 600 feet from the end of the runway 21 where the spacing may then be increased in increments until the centerline spacing is approximately 20 feet between light sources 26 at about 3,000 feet from the end of runway 21.

Following the aircraft touchdown, the problem of distinguishing the intersection 40 of turnout taxiway 22 and the main runway 21 (see FIGS. 2 and 3) is also greatly alleviated by employing the principles of my invention. Delineation of this intersection 40 becomes extremely important, as pilots turn off the runway 21 onto the taxiway 22 at high speeds. The pilots require initial information as to the exact location of the intersection or starting point 40 of the turn, as far ahead as possible. Tests indicate that the basic information as to the intersection 40 of the runway 21 and the turnoff taxiway 22 should be conveyed to the pilot by the time he has approached to within 2,000 feet of the exit taxiway 22. From such a distance, a perspective view of the taxiway entrance 41 is quite narrow and, if marked only by a simple break in the line of lights, would not be distinguishable.

In FIGS. 4 and 5 of the drawings, runway guidance patterns are shown in perspective under various lighting conditions, and viewed as they would appear at night to the pilot of an aircraft which has just touched down near the end of the runway 21. FIG. 4 shows the runway lighting pattern using only edgelight contour lines 28, which also border a turnout taxiway 22. The guidance pattern is shown as it would appear at 2,000 feet; from the taxiway entrance 41; and at the intersection point 40 where the aircraft should commence a turn onto the taxiway 22. FIG. 5 shows the same airfield employing runway edgelights 28, and light sources 26 forming a runway centerline 24, and a taxiway centerline 25. Tests have shown, and it may be seen from these drawings, that the airfield marking system using centerline contours for guidance gives the most satisfactory results in displaying an adequate directional pattern for the pilot.

A significant feature of my invention is that, by applying the contour-light principle, the light intensity may be increased at points of special interest, such as the runway threshold and the intersection 40 of the runway 21 and a turnout 22. This increase in brightness may be made either by decreasing the light spacing or my increasing the power from each light source 26. Whenever practical, it is preferable that the spacing of the lights 26 be decreased to achieve the brightness at the desired point, the highest in the field, since the use of bulbs of higher power may make the lines unnecessarily distracting or uncomfortable.

To achieve an ideal ground guidance system based on the present invention, considerations such as the size of the bulbs, spacing of lights on the runway and taxiway, for both edgelight and centerline lighting, must be made. Guidance pattern effectiveness can be altered by many variations and combinations to fit environment factors and the varied conditions of visibility. Again, the factor of economics enters the picture, especially for spacing of the lights, and thus the total number for a particular runway guidance system must be considered.

After extensive trials performed by the inventor, under varying conditions, an effective arrangement of ground guidance lights was found to include the use of both runway and taxiway edgelights 28 and centerlines 24 and 25. Where high-intensity approach lighting systems are installed, the runway threshold guidance lines 32 and 33, aforementioned, may be utilized effectively in accordance with the teachings of the present invention. The runway centerlines 24 should have greater intensity than the edgelights 28 by having lights on not more than about 20-foot centers and with the intensitives of individual lights reduced beyond the runway threshold 39 to approximately 3 watts at 11–12 volts, to avoid glare and "flash-by." Tests have shown that the taxiway centerline 25 spacing was considered to be unsatisfactory when the lights were more than 40 feet apart. At spacing of 40 feet or less, the appearance and guidance effect continually improved, and seemed to be best at 10 feet. To complete the visual guidance pattern, the edges of the runway 21 may be marked by lights 28 at greater spacing than at the centerline 24. It was found that runway edges 28 could be well defined by lights spaced from 50 to 100 feet, and that taxiway edges required at least 66-foot spacing.

It is to be expected, of course, that varying conditions of visibility caused by rain, fog, and darkness can alter the requirements for a particular airport. However, a simple application of the principles of the present invention as disclosed herein would enable anyone skilled in the art to provide a highly effective and efficient airport guidance system.

A typical center runway lighting circuit with a turnout lighting system is shown in FIG. 6. A low-voltage system is employed, having a generator 85 or some equivalent electrical power source producing 120 volts, with branch lines 86 running through transformers 87 which reduce the voltage to 12 volts at the subcircuit 88, comprising a supply line 54 and the desired number of light fixtures 27. Wires may be laid directly on the runway surface 29 or indented in grooves 62, if desired. Using the low-voltage system reduces problems of clearances within the fixture and exposure of electrical contacts to weather. Switching may be performed from remote control stations, using conventional low-voltage relays. As shown, the runway centerline system 24 and the turnout taxiway centerline system 25 may be on separate circuits, as would be the edgelighting system, to give greater flexibility of control. While the electrical systems set forth in the foregoing are deemed sufficient to efficiently operate the present runway lighting system, it is assumed that many variations in circuitry can be designed to suit the particular installation.

The light fixtures 27, whether mounted within holes to be flush or on top of the runway surface 29, may be attached to the runway surface 29 by any of several methods, depending on the type of runway surface. For example, studs (not shown) may be explosively driven into a concrete runway surface 29 and fastened by machine screws. For most satisfactory results, I prefer to mount the fixtures 27 by applying an adhesive substance such as a rubber-base type to the bottom portion of the fixture and merely cementing it to the runway surface 29.

*Operation*

In operation, the fixtures 27 which are described in my divisional application Serial No. 46,853 and each of which contain a light source are placed on the runway surface 29 and attached in one of the aforementioned prescribed manners. The contact pins of the light source in each fixture are connected with the supply line 54 on a sub-circuit 88 of a low-voltage system (see FIG. 6). Current flows from the generator 85 at 120 volts and is stepped down by transformers 87 to approximately 12 volts, after which it passes through the sub-circuits 88.

When incorporated in an airport ground guidance system, the fixtures 27 are spaced along the runway centerline 24 at varying spacings up to but not more than approximately 20 feet apart and along the taxiway centerline 25 at approximately 10 feet apart. In conjunction with the aforementioned approach-lighting system (shown in FIG. 3), I prefer to use 2½-ft. spacing on the runway centerline from the approach end of the runway and at roughly evenly spaced intervals increase the spacing to 5, 10, 15, and finally 20 ft., at about 3,000-ft. from the runway threshold. As the aircraft 23 nears the runway 21 following an approach at night and just prior to flareout and touchdown, the pilot views the pattern of lights straight ahead as a solid line of light indicating the runway centerline 24 on the runway surface 29. Following the touchdown of the aircraft 23, which may occur at from 100 to 200 knots, depending on the type of modern-day craft, the pilot steers down the line of small light sources 76 beaming from the fixtures 27. As the airplane 23 slows down on its landing roll, the pilot is presented with a solid line of visual pattern created by the plurality of closely-spaced light sources 26 and he readily can determine the intersection 40 of the runway centerline 24 and the taxiway centerline 25. At this point, the pilot steers the aircraft, still traveling at a relatively high ground-roll speed, along the taxiway centerline contour 25 which gradually turns away from the runway 21. The aircraft 23 thus leaves the runway 21 at maximum speed, permitting the next aircraft on the landing approach to proceed safely to its touchdown.

Thus, at night and during low visibility weather conditions, the present invention provides a system whereby lines can be created so as to define the location, direction and plane of the significant airport surfaces. Other important advantages of the system are that it is of relatively low cost and easy to install. The low voltage electrical requirements are such that inexpensive methods can be used for installation, without conduits or expensive trenches or pits. The system is readily adaptable to local conditions wherein greater emphasis can be placed on either the centerline guidance system only or combining it with the edgelighting system.

Another distinct advantage in presenting a visual centerline pattern to the pilot is that the pilot may be quickly oriented as he breaks out of an overcast on a landing approach and, using the illuminated centerline as a reference, may rapidly adjust for attitude discrepancies of roll or yaw. My invention not only provides a solid centerline presentation, but will also indicate to the pilot any large discrepancies in glide angle. For example, as shown in FIG. 2, if the pilot is too high the angle between the light rays will be great enough to show the lights separately rather than merging to present a solid line. The pattern of individual centerline lights could immediately indicate to the pilot that his approach was too high.

Aside from the many distinct advantages of the present invention as applied to airport guidance systems, the principles therein of contour lighting may be applied wherever contour lines on the ground are required for guidance or some other visual purpose. For example, my invention may be applied to roadway traffic guidance where automobiles traveling on high-speed turnpikes or freeways require well-marked turnouts to permit the greatest safety and smoothest traffic operation in all weather and at night time. My lineal guidance system may also be used in marking lanes for traffic handling especially in adverse weather and where the direction of traffic is changed in particular lanes to accommodate traffic loads at different times of day.

To those skilled in the art to which this invention relates, many changes in construction and widely differing embodiments and applications of the invention will suggest themselves without departing from the spirit and scope of the invention. Therefore, the disclosures and the description herein are purely illustrative and are not intended to be in any sense limiting.

I claim:

1. A marking system for an airport having a runway and a high-speed turnout taxiway which gradually curves away from the axial path of the runway, a lighting system for the runway and taxiway comprising single-point light sources arranged in closely spaced relation on the runway centerline and on substantially a centerline of the turnout taxiway, whereby the runway and taxiway centerlines appear as solid lines as viewed by a pilot of an approaching aircraft and the intersection thereof is easily distinguishable.

2. The device as described in claim 1, wherein the runway centerline lights are spaced up to approximately 20 feet apart and the taxiway centerline lights are spaced approximately 10 feet apart.

3. The invention described in claim 1, wherein the light sources are spaced closer at said intersection to give greater intensity at that point.

4. A ground guidance system for vehicles along a runway adapted to indicate to the one piloting the vehicle the path to be taken along the runway during the landing roll of said vehicle, said system comprising a multiplicity of individual simultaneously illuminated light sources spaced a predetermined distance apart in a line extending along said runway for the greater portion of the length thereof and far enough in from the edges of said runway to provide support on the runway for the wheels of said vehicle when its center axis is aligned with said line of light sources, said light sources being substantially flush with the surface of the runway and each light source being a point source of light of relatively low voltage and of a brightness which is related to the predetermined spacing between said point sources as to appear to the pilot as a plurality of discrete points of light for a distance along said line of light sources which subtends with the pilot's eye above the runway an angle of at least one minute, and to appear as a solid line of light along said distance.

5. The system according to claim 4 in which the spacing between individual light sources does not exceed approximately 20 feet.

6. The system according to claim 4 in which the power of each light source is in the range of 3 to 15 watts and the spacing between individual light sources is in the range of 2 to 20 feet.

7. The system according to claim 4 including an approach-lighting system in which said line of light sources providing the center line of the runway commences at the termination of said approach-lighting system, a second multiplicity of individual light sources on the runway surface forming a plurality of light lines axially aligned with the runway and extending from the threshold of the runway down a portion of its length.

8. The system according to claim 7 wherein the spacing of the runway centerline lights is approximately 2 feet at the runway threshold and increases to 20 feet further down the runway.

9. The system of claim 8 wherein the light sources utilize from 3 to 15 watts of power and are visible only in a direction to be viewed by an approaching pilot.

10. In a marking system for an air field having a landing strip, a plurality of light sources arranged in closely spaced relation at the edge of the landing strip and extending from the landing strip threshold for at least the greater portion of the length of said landing strip along the centerline of said landing strip, following generally the path to be passed over by a plane in landing or taking off, in which the lighted filament of each light source is in direct view of the pilot and the plurality of light filaments appear as a solid light line from the far end of the runway for a substantial distance toward the plane, and individually spaced lights near the plane appear separate and wherein said lights utilize from 3 to 15 watts of power and are shrouded to permit the lights to be viewed from a predetermined direction of approach only.

References Cited in the file of this patent

UNITED STATES PATENTS

| | | |
|---|---|---|
| 1,342,860 | Mortimer | June 8, 1920 |
| 1,572,214 | McEwing | Feb. 9, 1926 |
| 1,860,685 | Morris | May 31, 1932 |
| 2,162,302 | Greene | June 13, 1939 |
| 2,184,004 | Pennow | Dec. 19, 1939 |
| 2,296,936 | Logan et al. | Sept. 29, 1942 |
| 2,438,453 | Powell | Mar. 23, 1948 |
| 2,497,427 | Weiss | Feb. 14, 1950 |
| 2,557,165 | Wyatt | June 19, 1951 |
| 2,572,451 | Custer | Oct. 23, 1951 |
| 2,609,437 | Garbell | Sept. 2, 1952 |